Patented Dec. 21, 1937

2,102,830

UNITED STATES PATENT OFFICE 2,102,830

FERTILIZER MANUFACTURE

John L. Brill, Newark, Del., assignor to E. I. du Pont de Nemours & Company, Wilmington, Del., a corporation of Delaware No Drawing. Application April 9, 1935, Serial No. 15,399

12 Claims. (Cl. 71—30)

This invention relates to fertilizers and more particularly to nitrogenous phosphatic fertilizers and methods of production thereof.

It is known that phosphate rock may be decomposed by various mineral acids to give valuable fertilizer materials, generally referred to as superphosphates. It is also known to add various nitrogen-containing materials to such superphosphates in processes of preparing complete or finished fertilizers.

The practice has become established in the fertilizer industry of adding inorganic nitrogen to superphosphate by treating the same with free or uncombined ammonia that will react with the acidic components of the superphosphate. Anhydrous ammonia, aqua ammonia and nitrogen-containing liquids such as ammonium carbonate-containing solutions have been used in treating ordinary superphosphate, double superphosphate, and the like, and as a source of inorganic nitrogen in fertilizers containing superphosphate or double superphosphate as one constituent.

It has been found that the addition of inorganic nitrogen to superphosphate by treating with free or uncombined ammonia such as anhydrous and aqua ammonia is practically and economically desirable, but it has the disadvantage that there is a fairly definite upper limit beyond which the superphosphate will not absorb further ammonia without reduction in its commercial value. That is, it will not absorb further ammonia without partial reversion of the citrate soluble to citrate insoluble phosphoric acid with consequent loss in commercial value of the phosphoric acid.

The addition of fixed ammonia, as well as free or uncombined ammonia, in the form of a liquid or solution is equally desirable. This has been accomplished to a limited degree by the addition of urea, sodium nitrate, ammonium nitrate, and the like to ammoniating solutions. The content of fixed ammonia in ammoniating solutions has been limited, however, by the solubility of the solute at the relatively low temperatures frequently encountered in commercial practice, by the desirability of maintaining a relatively high ammonia content, and by the limitations on the quantity of water that may be used as a solvent and still produce fertilizers of satisfactory physical properties.

It is the object of this invention to provide a means for the preparation of improved ammoniating solutions covering a very wide range of free to fixed ammonia in which, as desired, the fixed ammonia may be organic or a combination of organic and inorganic materials. A second objective of the invention is to provide a method for the manufacture of improved fertilizers.

Other objects and advantages of the invention will be apparent by reference to the following specification in which its preferred details and embodiments are described.

According to the present invention highly desirable ammoniating solutions or liquors may be prepared by the use of formamide as one component and improved fertilizers may be prepared by the use of formamide alone or formamide-containing ammoniating solutions. Products, such as ammonium formate, that result from the hydrolysis of decomposition of formamide, are also desirable constituents of ammoniating liquors and improved fertilizers.

Formamide is a liquid at normal temperatures (i. e. down to +3° C.), is practically non-volatile, contains 31% nitrogen, is miscible with water and ammonia, is a good source of nitrogen for plant growth, and is a good solvent for many nitrogenous compounds. It, therefore, possesses the outstanding qualifications for a desirable nitrogen-carrying or nitrifying agent and is especially useful as a constituent of ammoniating solutions or liquors. I have found that by the use of formamide in ammoniating liquors the ratio of fixed to free ammonia may be varied over a wide range and at the same time the use of water eliminated or percentage of water can be kept low, the total ammonia content high, and the crystallization temperature low enough for commercial purposes. As a matter of fact, one of the important features of this invention resides in the fact that by the use of formamide a wide range of proportions of fixed to free ammonia may be obtained in fertilizers and nitrogen-carrying solutions as well as fertilizers of high fixed nitrogen content produced.

This invention may be practiced by addition of formamide to the usual fertilizer materials such as commercial, double and triple superphosphate, potash salts, natural organic materials, such as peat moss, bone meal, and the like, in various ways.

The formamide may be added alone (as fixed ammonia containing material), or before, during, or after addition of other materials in preparing a fertilizer. Thus, when it is desired to add fixed ammonia as a liquid to a fertilizer material, formamide may be used alone or added to or substituted for ingredients of other ammoniating solutions generally, such, for example, as the ammoniating or nitrifying solutions described in U. S. Patent 1,894,136, which contain both inorganic and organic ammonia. Again, proceeding according to this invention, formamide may be added to a phosphatic material, either before, after, or during addition of other materials, for example potash salts, such as potassium sulfate, chloride, and nitrate; ammonium salts such as ammonium chloride, nitrate, sulfate, carbamate, mono- and diammonium phosphates, or the like, and then the product obtained may be further ammoniated by use of commercial aqua or anhydrous ammonia. Or, alternatively, the phosphatic material may be first ammoniated, somewhat at least by use of ammonia as above described, and thereafter formamide added to the ammoniated product; or the formamide may be added during such ammoniation with ammonia or like nitrgogen-containing material while, at the same time, after or before, other materials such as above described may be added as are desired to obtain a finished fertilizer.

For best results in the case of liquid compositions containing one or more normally solid compounds, I have found that it is preferable, altho not necessary, to utilize at least about 5% formamide in the ammoniating liquor in order to obtain the benefit of its desirable solubilizing properties. No upper limit exists, however, inasmuch as formamide alone may be used as nitrogen-carrying liquid, if desired.

I have, for example, found that a desirable finished fertilizer may be obtained by first preparing a liquor containing various proportions of formamide, ammonia and water. This liquor may be sprayed upon or otherwise mixed with phosphatic materials and the resulting product thereafter mixed with additional fertilizer materials, such as potash salts, and the like and/or other materials as those previously described. The proportions of liquor to superphosphate or other phosphatic materials may vary, dependent upon the nitrogen content which it is desired to have in the final product.

Similarly I have found that a desirable liquor for use in nitrogen incorporation and which contains inorganic and organic nitrogen may be obtained by mixing formamide and ammonia, water and urea. When this nitrogen-containing liquor is incorporated into a phosphatic material as above described a highly desirable fertilizer results which may, if desired, be further mixed with other materials to produce a complete fertilizer.

I have found, as previously indicated, that formamide may be advantageously incorporated into nitrogen-containing or ammoniating liquors generally. For example, formamide may be used in ammoniating solutions or nitrogen-containing solutions as a solubilizing agent for a wide variety of nitrogenous compounds including nitrates, such as sodium and calcium nitrate; ammonium salts of inorganic acids, such as ammonium chloride, ammonium nitrate and ammonium sulfate; ammonium salts of organic acids, such as ammonium formate and ammonium acetate; and organic nitrogenous materials such as urea, acetamide, amines, and amino acids. Likewise it may be used as a solubilizing agent for potassic and phosphatic fertilizer materials, such as potassium chloride, potassium sulfate, mono- and dicalcium phosphate and the like. In these solutions formamide will generally be used in conjunction with water and/or free or uncombined ammonia as solvents or solubilizing agents. Its use, however, is not restricted to such combinations, for it may be used alone or in combination with one or more solubilizing agents such as water, uncombined ammonia and other nitrogenous materials. In the solutions thus prepared the ratio of fixed to free or uncombined ammonia can readily be varied over an extremely wide range, for example from 1 part of fixed ammonia and 99 parts of free or uncombined ammonia to 99 parts of fixed ammonia to 1 part of free or uncombined ammonia. The proportion of fixed ammonia derived from inorganic and organic sources can also be varied over a wide range. These variations can be attained without the addition of high percentages of water, such as are objectionable in ammoniating solutions, without lowering the total ammonia content unduly and without having crystallization temperatures so high that commercial use is not practicable.

In utilizing solutions of formamide, ammonia, urea, ammonium nitrate or like combinations of materials which are classed as sources of inorganic and organic ammonia, it will be apparent that many advantages are present. Containing, as such solutions do, uncombined ammonia, fixed organic ammonia and fixed inorganic ammonia in a highly concentrated form, they permit the introduction in a single operation and in liquid form, of several forms of ammonia into a fertilizer base; and since the relative proportions of formamide, urea, or other fixed ammonia compounds and ammonia may be easily varied, a great flexibility of operation is at the hand of the operator. Thus, for example, by varying the composition of the ammoniating solution, from 1 to more than 10% nitrogen can be added to a commercial grade of superphosphate in one operation.

Important economies can be obtained in conjunction with the manufacture of urea, according to this invention, similarly to those set forth in U. S. 1,894,136. Thus, the urea synthesis melt obtained by pressure reaction of ammonia and carbon dioxide, or compounds containing them, need not be treated for removal of unreacted constituents and may be directly adjusted by addition of formamide thereto to yield a desirable ammoniating solution containing the desired ratios of fixed and free ammonia. For example, by reaction of 142.8 parts by weight of ammonia and 92.4 parts of carbon dioxide at a temperature of 170° C., and a pressure of about 133 atmospheres, there is obtained a synthesis melt having the following approximate composition: ammonia 30%, urea 38%, ammonium carbamate 21%, and water 11%. By mixing 100 parts by weight of this melt 20 parts formamide and 20 parts ammonia, a desirable nitrifying agent is obtained containing fixed to free nitrogen in the ratio of 1:1.6, while at the same time eliminating any other adjustment or ingredient-removal steps. In like manner, starting with 100 parts of this urea synthesis melt, the addition of 46.3 parts formamide will give a desirable nitrogen-carrying liquid having 1:1 ratio of fixed to free nitrogen.

As a further advantage in such an operation, according to this invention, the crystallization and vapor pressure characteristics of such modified urea synthesis melts are favorably affected by formamide addition thereto, at the same time as the desired fixed to free ammonia ratio is obtained.

Fertilizers may be produced according to this invention by mixing nitrogen-containing or ammoniating liquid with suitable proportions of superphosphate or mixed fertilizers containing phosphatic materials in a mixing drum, being sprayed thereupon if desired, the proportions of liquid to superphosphate being dependent upon the desired chemical composition of the final product. Compared with processes involving the separate addition of the same ingredients, a lower temperature on ammoniation and lower hygroscopicity of the product result.

The following examples, altho not limiting, indicate how the invention may be practiced. (Parts given are by weight.)

*Example 1.*—To 2000 pounds of commercial superphosphate (17% $P_2O_5$) in a conventional mixing drum there were slowly mixed 200 pounds of formamide. There resulted a fertilizer base of satisfactory physical appearance containing 2.8% nitrogen and 15.5% $P_2O_5$. Although the formamide was added to the superphosphate in the form of a spray, it could easily be added in thin streams or other manner resulting in intimate mixture.

*Example 2.*—To 1040 pounds of the product obtained as described in Example 1 there were added, in a mixing drum, 200 pounds of tankage, 56 pounds of ammonium sulfate, 160 pounds of potassium chloride, 514 pounds of filler (sand). This complete mixture was further ammoniated by the addition thereto of 30 pounds of anhydrous ammonia.

A satisfactory complete fertilizer was obtained. Altho the ammonia was added during mixture of the other listed ingredients it could have been added to the material of Example 1 before addition of the other ingredients, or thereafter.

*Example 3.*—Similarly to the procedure of Example 1, with 2000 pounds of commercial superphosphate there were mixed 215 pounds of a liquid containing 40 parts ammonia, 40 parts formamide, and 20 parts water. The result was a fertilizer base of desirable characteristics, containing 4.4% nitrogen and 15.3% $P_2O_5$.

*Example 4.*—To 1050 pounds of the product obtained as described in Example 3 there were added, in a mixing drum, 200 pounds of tankage, 92 pounds of ammonium sulfate, 160 pounds of muriate of potash and 498 pounds of filler. I utilize sand as the filler but in some instances prefer to utilize dolomite or other liming materials, particularly when a neutral fertilizer is desired. The product obtained as above described was found to be of desirable physical character.

*Example 5.*—To 2000 pounds of commercial superphosphate there were added, in a conventional mixing drum, 325 pounds of an ammoniating liquor containing 35 parts urea, 15 parts formamide, 26 parts ammonia, and 24 parts water.

A desirable fertilizer base was obtained containing 5.9% nitrogen and 14.6% $P_2O_5$.

*Example 6.*—To 1100 pounds of fertilizer base obtained as described in Example 5, there were added, in a mixing drum, 205 pounds of tankage, 160 pounds of muriate of potash and 535 pounds of filler (sand). A very desirable complete fertilizer was obtained.

Although this fertilizer was obtained as above described it will be understood that the sequence and manner of mixture of ingredients may be varied. Thus, for example, the liquor of Example 5 may be added to the superphosphate simultaneously with the ingredients of the present example, or thereafter, as well as before.

Likewise dolomite or other fillers may be, equally if not preferably, utilized rather than sand.

*Example 7.*—To 946 pounds of commercial superphosphate 205 pounds tankage, 160 pounds muriate of potash, and 535 pounds of sand there was added 154 pounds of the liquor described in Example 5. As described in Example 6, variations can likewise be made in sequence and manner of mixture of ingredients without departing from this invention.

*Example 8.*—Following the method described in previous examples, to 2000 pounds of commercial superphosphate were added 328 pounds of a liquor containing 50 parts ammonium nitrate, 15 parts formamide, 25 parts ammonia and 10 parts water. A desirable fertilizer base was obtained. Sodium or calcium nitrate may be substituted for at least a part of, if not all of, the ammonium nitrate if desired.

*Example 9.*—To 1100 pounds of the product obtained in Example 8 there was added, in a mixing drum, 190 pounds of tankage, 160 pounds of muriate of potash and 550 pounds of filler (sand) to give a desirable complete fertilizer.

*Example 10.*—Similarly to the ammoniating or nitrogen-carrying liquors described in previous examples, other liquid compositions may likewise be added in varying ratios to phosphatic materials to give fertilizer bases or complete fertilizers when simultaneously or subsequently or previously mixed with other fertilizer ingredients. Illustrative of the many compositions one or more of which may be used in this manner according to this invention are the following:

| Substances | Parts by weight |
|---|---|
| Formamide | 30 |
| Ammonia | 70 |
| | |
| Formamide | 70 |
| Urea | 30 |
| | |
| Formamide | 25 |
| Urea | 50 |
| Ammonia | 25 |
| | |
| Formamide | 30 |
| Urea | 35 |
| Ammonia | 20 |
| Water | 15 |
| | |
| Formamide | 28 |
| Urea | 30 |
| Ammonia | 20 |
| Water | 7 |
| Ammonium carbamate | 15 |
| | |
| Formamide | 60 |
| Sodium nitrate or calcium nitrate | 40 |
| | |
| Formamide | 15 |
| Ammonium nitrate | 51 |
| Ammonia | 17 |
| $H_2O$ | 17 |
| | |
| Formamide | 40 |
| Ammonia | 20 |
| Water | 10 |
| Sodium nitrate or calcium nitrate | 30 |
| | |
| Formamide | 15 |
| Ammonium nitrate | 50 |
| Ammonia | 20 |
| Water | 15 |
| | |
| Formamide | 20 |
| Ammonium formate | 15 |
| Urea | 25 |
| Ammonium nitrate | 10 |
| Ammonia | 20 |
| Water | 10 |

In the case of these and similar compositions it will be understood that various proportions of the compositions to superphosphate or phosphatic materials may be utilized such as, say from 50–400 pounds of liquor composition per 2000 pounds of superphosphate.

Various changes may be made in the methods and details of this invention without departing therefrom or sacrificing any of the advantages thereof.

I claim:

1. A fertilizer nitrifying agent comprising a liquid containing formamide, dissolved free ammonia, urea and a relatively small quantity of water.

2. A fertilizer nitrifying agent comprising a liquid containing formamide, dissolved free ammonia, urea, ammonium carbamate, and a relatively small quantity of water.

3. A fertilizer nitrifying agent comprising a liquid containing formamide, ammonia, urea and a relatively small quantity of water, the formamide being present to an extent of at least about 5% by volume of the liquid.

4. A fertilizer nitrifying agent comprising a liquid containing formamide, ammonia, urea, ammonium carbamate, and a relatively small quantity of water, the formamide being present to an extent of at least about 5% by volume of the liquid.

5. A fertilizer nitrifying agent comprising a liquid containing a urea synthesis melt and formamide.

6. A method of producing a fertilizer which comprises adding to acidic fertilizer materials a liquid containing formamide, dissolved free ammonia, urea, and a relatively small quantity of water.

7. A method of producing a fertilizer which comprises adding to acidic fertilizer materials a liquid containing formamide, dissolved free ammonia, urea, ammonium carbamate, and a relatively small quantity of water.

8. A method of producing a fertilizer which comprises adding to acidic fertilizer materials a liquid containing formamide, ammonia, urea, and a relatively small quantity of water, the formamide being present to an extent of at least about 5% by volume of the liquid.

9. A method of producing a fertilizer which comprises adding to acidic fertilizer materials a liquid containing formamide, ammonia, ammonium carbamate, urea, and a relatively small quantity of water, the formamide being present to an extent of at least about 5% by volume of the liquid.

10. A method of producing a fertilizer which comprises adding to acidic fertilizer materials a liquid containing a urea synthesis melt and formamide.

11. A method of producing a fertilizer which comprises adding to acidic fertilizer materials a liquid containing a urea synthesis melt and formamide, in the proportions of from 50 to 400 pounds of liquid per 2000 pounds of acidic fertilizer materials.

12. A method of producing a fertilizer which comprises adding to acidic fertilizer materials a liquid containing from 5 to 28 parts by weight of formamide, 30 to 38 parts urea, 20 to 34 parts ammonia, 15 to 21 parts ammonium carbamate and 7 to 11 parts water, the liquid being added in the proportions of from 50–400 pounds liquid per 2000 pounds of acidic fertilizer materials.

JOHN L. BRILL.